(12) United States Patent
Maddukuri et al.

(10) Patent No.: US 11,409,518 B2
(45) Date of Patent: Aug. 9, 2022

(54) REMOTE ACCESS CONTROLLER DEVICE UPDATE SYSTEM

(71) Applicant: Dell Products L.P., Round Rock, TX (US)

(72) Inventors: Akkiah Choudary Maddukuri, Austin, TX (US); Elie Jreij, Pflugerville, TX (US); Wei Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 104 days.

(21) Appl. No.: 16/936,641

(22) Filed: Jul. 23, 2020

(65) Prior Publication Data

US 2022/0027147 A1     Jan. 27, 2022

(51) Int. Cl.
*G06F 9/44*     (2018.01)
*G06F 9/445*    (2018.01)
*G06F 9/48*     (2006.01)
*G06F 8/71*     (2018.01)
*G06F 8/61*     (2018.01)
(Continued)

(52) U.S. Cl.
CPC ............... *G06F 8/71* (2013.01); *G06F 8/63* (2013.01); *G06F 9/4403* (2013.01); *G06F 16/2282* (2019.01); *G06F 16/23* (2019.01); *G06F 8/65* (2013.01); *G06F 8/656* (2018.02);
(Continued)

(58) Field of Classification Search
CPC ..... G06F 8/71; G06F 8/63; G06F 8/66; G06F 8/65; G06F 16/23; G06F 16/2282; G06F 9/4403; G06F 9/445; G06F 8/656; G06F 8/658; G06F 9/4843; G06F 9/44505; G06F 9/44526
See application file for complete search history.

(56) References Cited

U.S. PATENT DOCUMENTS 8,510,422 B2 *   8/2013  Phung ............... H04L 41/0809
                                              709/222
10,152,432 B1 *  12/2018  Dasar ................. G06F 21/6245
                     (Continued)

OTHER PUBLICATIONS

Sujit Kumar Muduli et al., Verification of Authenticated Firmware Loaders, Oct. 22-25, 2019, [Retrieved on Feb. 10, 2022]. Retrieved from the internet: <URL: https://ieeexplore.ieee.org/stamp/stamp.jsp?tp=&arnumber=8894262> 10 Pages (110-119) (Year: 2019).*

*Primary Examiner* — Anibal Rivera
(74) *Attorney, Agent, or Firm* — Joseph Mencher

(57) ABSTRACT

A remote access controller device update system includes a memory system that is configured to store a BIOS firmware image including BIOS code and first remote access controller information. A BIOS is coupled to the memory system and is configured to utilize BIOS code stored on the memory system. A remote access controller device is coupled to the memory system and is configured to determine that the BIOS firmware image is stored in the memory system, and identify the first remote access controller information included in the BIOS firmware image. The remote access controller device then determines that the first remote access controller information provides an update to second remote access controller information stored on the remote access controller device and, in response, stores the first remote access controller information on the remote access controller device and performs at least one operation using the first remote access controller information.

20 Claims, 11 Drawing Sheets

(51) Int. Cl.
  *G06F 16/22* (2019.01)
  *G06F 16/23* (2019.01)
  *G06F 9/4401* (2018.01)
  G06F 8/65 (2018.01)
  G06F 8/658 (2018.01)
  G06F 8/656 (2018.01)

(52) U.S. Cl.
  CPC .......... *G06F 8/658* (2018.02); *G06F 9/44505* (2013.01); *G06F 9/44526* (2013.01); *G06F 9/4843* (2013.01)

(56) References Cited

U.S. PATENT DOCUMENTS

| | | | |
|---|---|---|---|
| 2016/0291958 A1* | 10/2016 | Riedisser | G06F 8/65 |
| 2017/0010884 A1* | 1/2017 | Liu | G06F 8/656 |
| 2018/0039546 A1* | 2/2018 | Lambert | G06F 11/2635 |
| 2018/0075242 A1* | 3/2018 | Khatri | H04L 9/3263 |
| 2018/0247059 A1* | 8/2018 | Nara | H04L 9/3247 |
| 2018/0314441 A1* | 11/2018 | Suryanarayana | G06F 3/065 |

\* cited by examiner

REMOTE ACCESS CONTROLLER DEVICE UPDATE SYSTEM

BACKGROUND

The present disclosure relates generally to information handling systems, and more particularly to updating remote access controller devices used in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices and/or other computing devices known in the art, are sometimes provided with remote access controller devices such as, for example, the integrated DELL® Remote Access Controller (iDRAC) available in server devices provided by DELL® Inc. of Round Rock, Tex., United States. Conventional remote access controller devices may be provided across server device platforms using a common remote access controller firmware that is utilized by remote access controller devices included in any of the server devices in any of the server device platforms. For example, the remote access controller firmware discussed above may be provided via a binary file that includes code and server-device-platform-specific tables that are utilized by the remote access controller devices, with the server-device-platform-specific tables provided for different server-device-platform-specific topologies (e.g., thermal tables for one or more server device platform topologies, General Purpose Input/Output (GPIO) map tables for one or more server device platform topologies, sensor tables for one or more server device platform topologies, fan tables for one or more server device platform topologies, power parameter tables for one or more server device platform topologies, Peripheral Component Interconnect (PCI) tables for one or more server device platform topologies, etc.), and utilized by the remote access controller devices depending on the particular server device platform of the server device they are included in. However, the provisioning of server-device-platform tables in the remote access controller firmware can raise some issues.

For example, the inclusion of thermal tables for one or more server-device-platform topologies in the remote access controller firmware may require the development and release of new remote access controller firmware each time a new server device platform is developed (or an existing server device platform is modified) in a manner that requires new thermal tables for the new server device platform topology provided in that new server device platform. In a specific example, the modification of processing system configurations across one or more server device platforms (e.g., to utilize different numbers of cores, provide different processing system Thermal Design Powers (TDPs), and/or other processing system configuration modifications known in the art) may require the development and release of new/modified remote access controller firmware with new thermal tables that allow the remote access controller devices to support those processing system configurations (e.g., even when those processing system modifications do not provide any user-recognizable feature changes). As will be appreciated by one of skill in the art, the development, testing, validation, and release of new/modified remote access controller firmware can take several months, which is relatively time and resource intensive for remote access controller firmware that would otherwise be updated approximately once or twice per year.

Accordingly, it would be desirable to provide remote access controller device update system that addresses the issues discussed above.

SUMMARY

According to one embodiment, an Information Handling System (IHS) includes a remote access controller processing system; and a remote access controller memory system that is coupled to the remote access controller processing system and that includes instructions that, when executed by the remote access controller processing system, cause the remote access controller processing system to provide a remote access controller engine that is configured to: determine that a Basic Input/Output System (BIOS) firmware image is stored in a BIOS memory system; identify first remote access controller information that is included in the BIOS firmware image; determine that the first remote access controller information provides an update to second remote access controller information that is stored on a remote access controller database; store, in response determining that the first remote access controller information provides the update to the second remote access controller information, the first remote access controller information on the remote access controller database; and perform at least one operation using the first remote access controller information.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
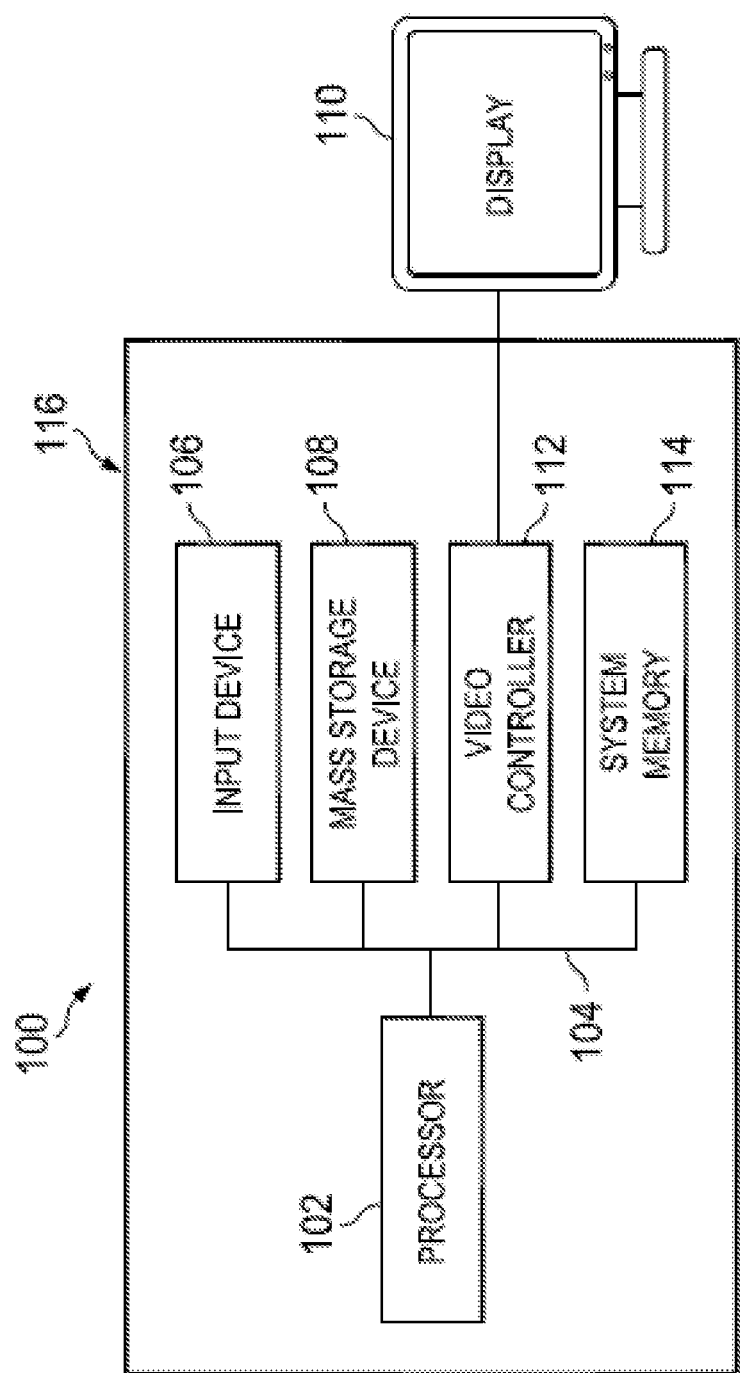
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
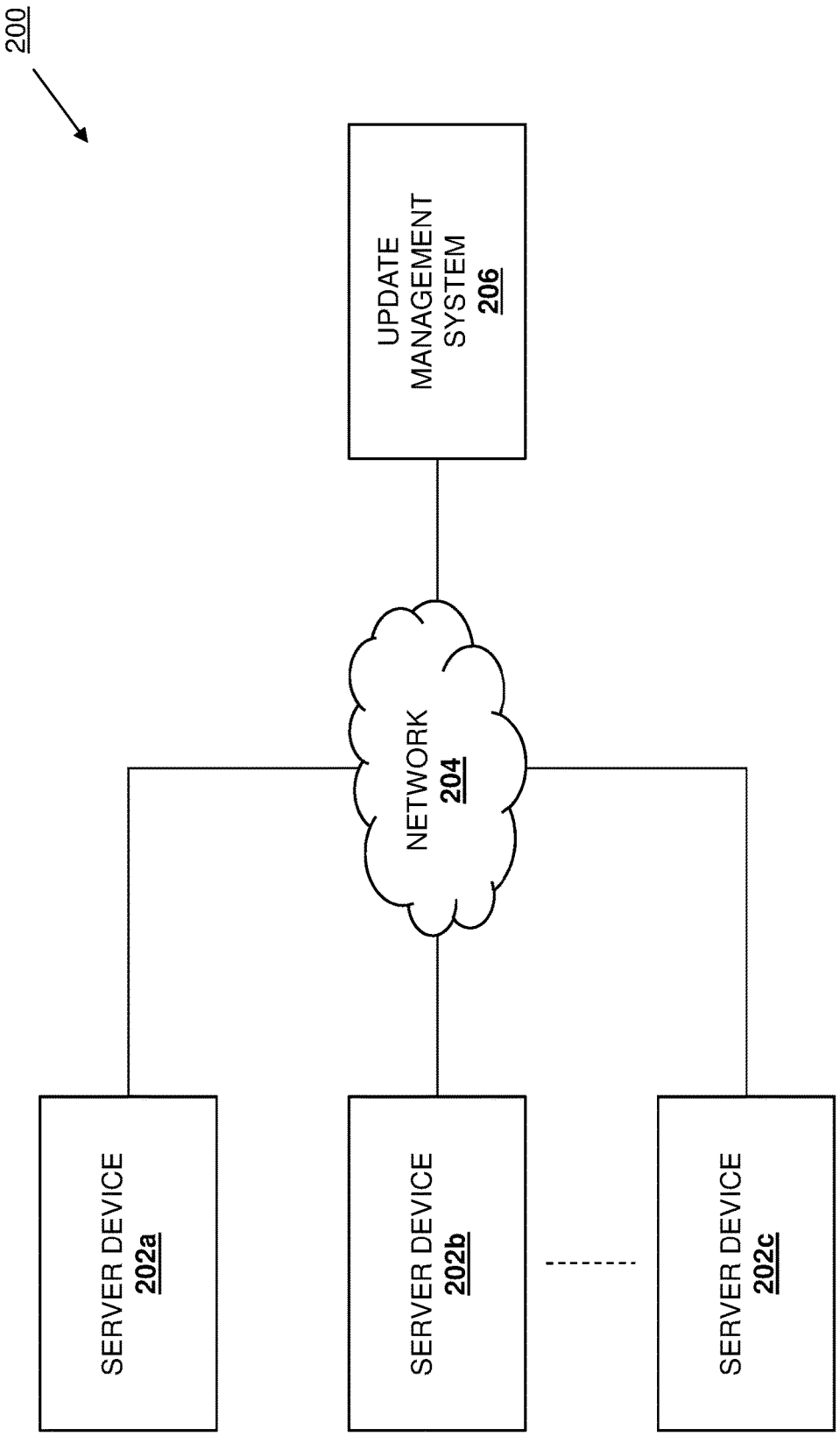
FIG. 2 is a schematic view illustrating an embodiment of a networked system that may provide the remote access controller device update system of the present disclosure.

Referring now to FIG. 2, an embodiment of a networked system 200 is illustrated. In the illustrated embodiment, the networked system 200 includes a plurality of server devices 202a, 202b, and up to 202c, any of which may utilize the remote access controller device update system of the present disclosure. In an embodiment, any or all of the server devices 202a-202c may be provided by the IHS 100 discussed above with reference to FIG. 1, and/or may include some or all of the components of the IHS 100. However, while illustrated and discussed as being provided by server devices, one of skill in the art in possession of the present disclosure will recognize that a variety of computing devices may be provided in the networked system 200 and may operate similarly as the server devices 202a-202c discussed below to utilize the remote access controller device update system of the present disclosure. In the illustrated embodiment, each of the server devices 202a-202c are coupled to a network 204 such as, for example, a Local Area Network (LAN), the Internet, combinations thereof, and/or any other network that would be apparent to one of skill in the art in possession of the present disclosure. Furthermore, an update management system 206 is coupled to the network 204 and, as discussed in the specific examples provided below, operates to provide updates to the server devices 202a-202c. However, while the updates discussed below are described as BIOS firmware updates and remote access controller information updates, one of skill in the art in possession of the present disclosure will appreciate that remote access controller devices may be updated as part of a variety other types of updates as discussed below using the remote access controller device update system of the present disclosure. A such, while a specific networked system 200 has been illustrated and described, one of skill in the art in possession of the present disclosure will recognize that the remote access controller device update system of the present disclosure may include a variety of components and component configurations while remaining within the scope of the present disclosure as well.

Figure 3:
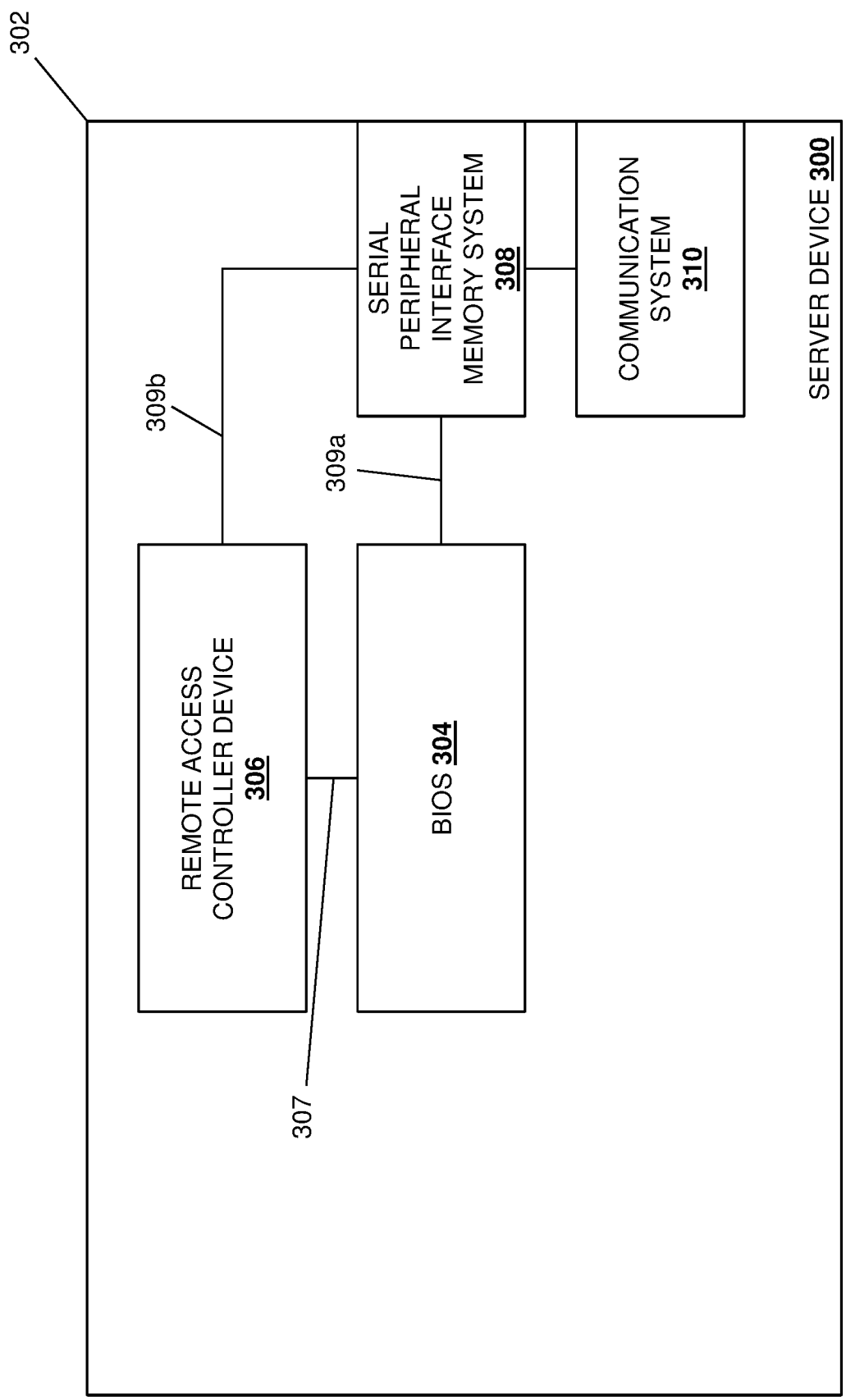
FIG. 3 is a schematic view illustrating an embodiment of a server device that may be provided in the networked system of FIG. 2.

Referring now to FIG. 3, an embodiment of a server device 300 is illustrated that may provide any or all of the server devices 202a-202c discussed above with reference to FIG. 2. As such, the server device 300 may be provided by the IHS 100 discussed above with reference to FIG. 1 and/or may include some or all of the components of the IHS 100. Furthermore, while illustrated and discussed as being provided by a server device 300, one of skill in the art in possession of the present disclosure will recognize that the functionality of the server device 300 discussed below may be provided by other computing devices that are configured to operate similarly as the server device 300 discussed below. In the illustrated embodiment, the server device 300 includes a chassis 302 that houses the components of the server device 300, only some of which are illustrated below. For example, the chassis 302 may house a Basic Input/Output System (BIOS) processing system (not illustrated, but which may include the processor 102 discussed above with reference to FIG. 1) and a BIOS memory system (not illustrated, but which may include the memory 114 discussed above with reference to FIG. 1) that is coupled to the BIOS processing system and that includes instructions that, when executed by the BIOS processing system, cause the BIOS processing system to provide a BIOS 304 that is configured to perform the functionality of the BIOS and/or server devices discussed below.

The chassis 302 may also house a remote access controller device 306 that may be provided by an integrated DELL® Remote Access Controller (iDRAC) available from DELL® Inc. of Round Rock, Tex., United States, a Baseboard Management Controller (BMC), and/or other remote access controller systems that would be apparent to one of skill in the art in possession of the present disclosure. As such, the remote access controller device 306 may provide an out-of-band management platform for the server device 300, and may be included on a separate expansion card in the server device 300, integrated into a motherboard in the server device 306, and/or in a variety of other manners that provide the remote access controller device 306 with resources that are separate from the rest of the server device 300, a browser-based and/or command-line interface for managing and monitoring the server device 300, and/or other remote access controller functionality that would be apparent to one of skill in the art in possession of the present disclosure. In some embodiments, the remote access controller device 306 may be provided by the IHS 100 discussed above with reference to FIG. 1 and/or may include some or all of the components of the IHS 100. As illustrated in FIG. 3 and discussed below, the BIOS 304 may be coupled to the remote access controller device 306 via a communication channel 307 that may be provided by a Shared Memory Architecture (SMA) interface and/or other communication channels known in the art.

The chassis 302 may also include a secondary memory system that is illustrated and described below as being provided by a Serial Peripheral Interface (SPI) memory system 308 that one of skill in the art in possession of the present disclosure will recognize may be provided by a BIOS memory system such as a BIOS SPI ROM/flash memory, although one of skill in the art in possession of the present disclosure will recognize that other types of memory systems that operate similarly to the SPI memory system 308 discussed below will fall within the scope of the present disclosure as well. As illustrated, each of the BIOS 304 and the remote access controller device 306 may be coupled to the SPI memory system 308 via communication channels 309a and 309b, respectively, that may be provided by SPI interfaces and/or other direct access communication channels known in the art.

The chassis 302 may also house a communication system 310 that is coupled to the SPI memory system 308 and that may be provided by a Network Interface Controller (NIC), wireless communication systems (e.g., BLUETOOTH®, Near Field Communication (NFC) components, WiFi components, etc.), and/or any other communication components that one of skill in the art in possession of the present disclosure would recognize allows information to be provided on the SPI memory system 308 via the network 204 discussed above with reference to FIG. 2. However, while remote access controller information is discussed below as being provided on the SPI memory system 308 remotely vis the network 204, one of skill in the art in possession of the present disclosure will recognize that remote access controller information may be provided on the SPI memory system 308 in other manners that will fall within the scope of the present disclosure as well. Thus, while a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
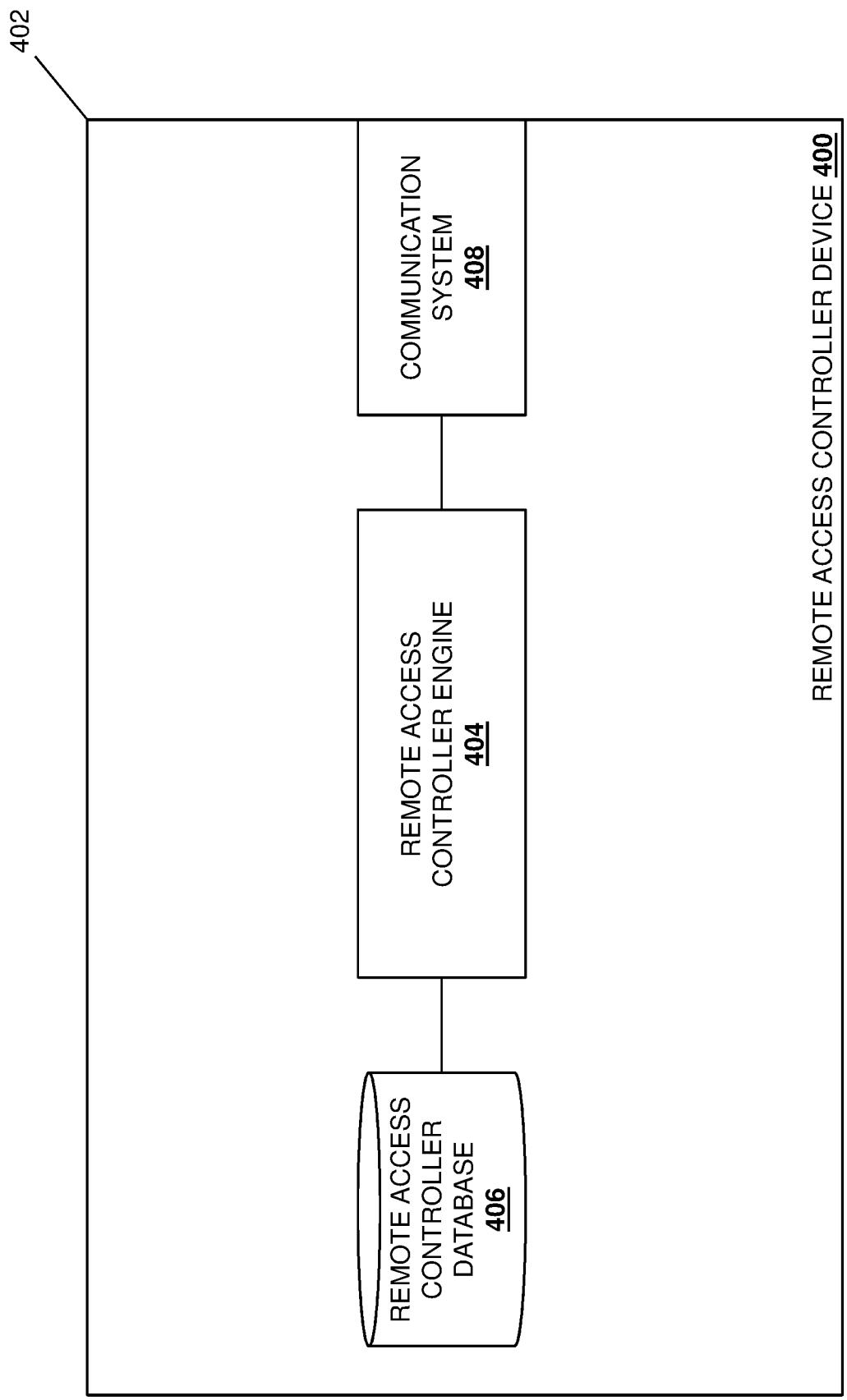
FIG. 4 is a schematic view illustrating an embodiment of a remote access controller device that may be included in the server device of FIG. 3.

Referring now to FIG. 4, an embodiment of a remote access controller device 400 is illustrated that may provide the remote access controller device 306 discussed above with reference to FIG. 3. As such, the remote access controller device 300 may be provided by the IHS 100 discussed above with reference to FIG. 1 and/or may include some or all of the components of the IHS 100, and in specific examples may be provided by an iDRAC available from DELL® Inc. of Round Rock, Tex., United States, a BMC, and/or other remote access controller systems that would be apparent to one of skill in the art in possession of the present disclosure. Furthermore, while illustrated and discussed as being provided by specific remote access controller devices, one of skill in the art in possession of the present disclosure will recognize that the functionality of the remote access controller device 400 discussed below may be provided by other devices that are configured to operate similarly as the remote access controller device 400 discussed below. In the illustrated embodiment, the remote access controller device 400 includes a chassis 402 that houses or supports the components of the remote access controller device 400, only some of which are illustrated below. For example, the chassis 402 may be provided by a card or other circuit board that may be coupled to a motherboard in the server device 300, may be part of (or integrated into) a motherboard in the server device 300, and/or provided in a variety of other manners that will fall within the scope of the present disclosure.

As illustrated in FIG. 4, the chassis 402 may also house or support a remote access controller processing system (not illustrated, but which may include the processor 102 discussed above with reference to FIG. 1) and a remote access controller memory system (not illustrated, but which may include the memory 114 discussed above with reference to FIG. 1) that is coupled to the remote access controller processing system and that includes instructions that, when executed by the remote access controller processing system, cause the remote access controller processing system to provide a remote access controller engine 404 that is configured to perform the functionality of the remote access controller engines and/or remote access controller devices discussed below. The chassis 402 may also house a storage system (not illustrated, but which may include the storage 108 discussed above with reference to FIG. 1) that is coupled to the remote access controller engine 404 (e.g., via a coupling between the storage system and the processing system) and that includes a remote access controller database 406 that is configured to store any of the information utilized by the remote access controller engine 404 discussed below.

The chassis 402 may also house a communication system 408 that is coupled to the remote access controller engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that one of skill in the art in possession of the present disclosure would recognize as providing access to the SRI memory system 308 discussed above with reference to FIG. 3. However, while a specific remote access controller device 400 has been illustrated, one of skill in the art in possession of the present disclosure will recognize that remote access controller devices (or other devices operating according to the teachings of the present disclosure in a manner similar to that described below for the remote access controller device 400) may include a variety of components and/or component configurations for providing conventional remote access controller device functionality, as well as the functionality discussed below, while remaining within the scope of the present disclosure as well.

Figure 5:
FIG. 5 is a flow chart illustrating an embodiment of a method for updating a remote access controller device.

Referring now to FIG. 5, an embodiment of a method 500 for updating a remote access controller device is illustrated. As discussed below, the systems and methods of the present disclosure provide remote access controller information updates for a remote access controller device as part of more regularly released BIOS information updates. For example, the remote access controller device update system of the present disclosure may include a memory system that is configured to store a BIOS firmware image that includes BIOS code and first remote access controller information. A BIOS is coupled to the memory system and is configured to utilize BIOS code that is stored on the memory system. A remote access controller device is coupled to the memory system and is configured to determine that the BIOS firmware image is stored in the memory system, and identify the first remote access controller information included in the BIOS firmware image. The remote access controller device then determines that the first remote access controller information provides an update to second remote access controller information that is stored on the remote access controller device and, in response, stores the first remote access controller information on the remote access controller device and performs at least one operation using the first remote access controller information. Thus, updates may be provided for remote access controller devices without the need to develop and release new remote access controller firmware each time an update of the remote access controller device is required.

Figure 6A:
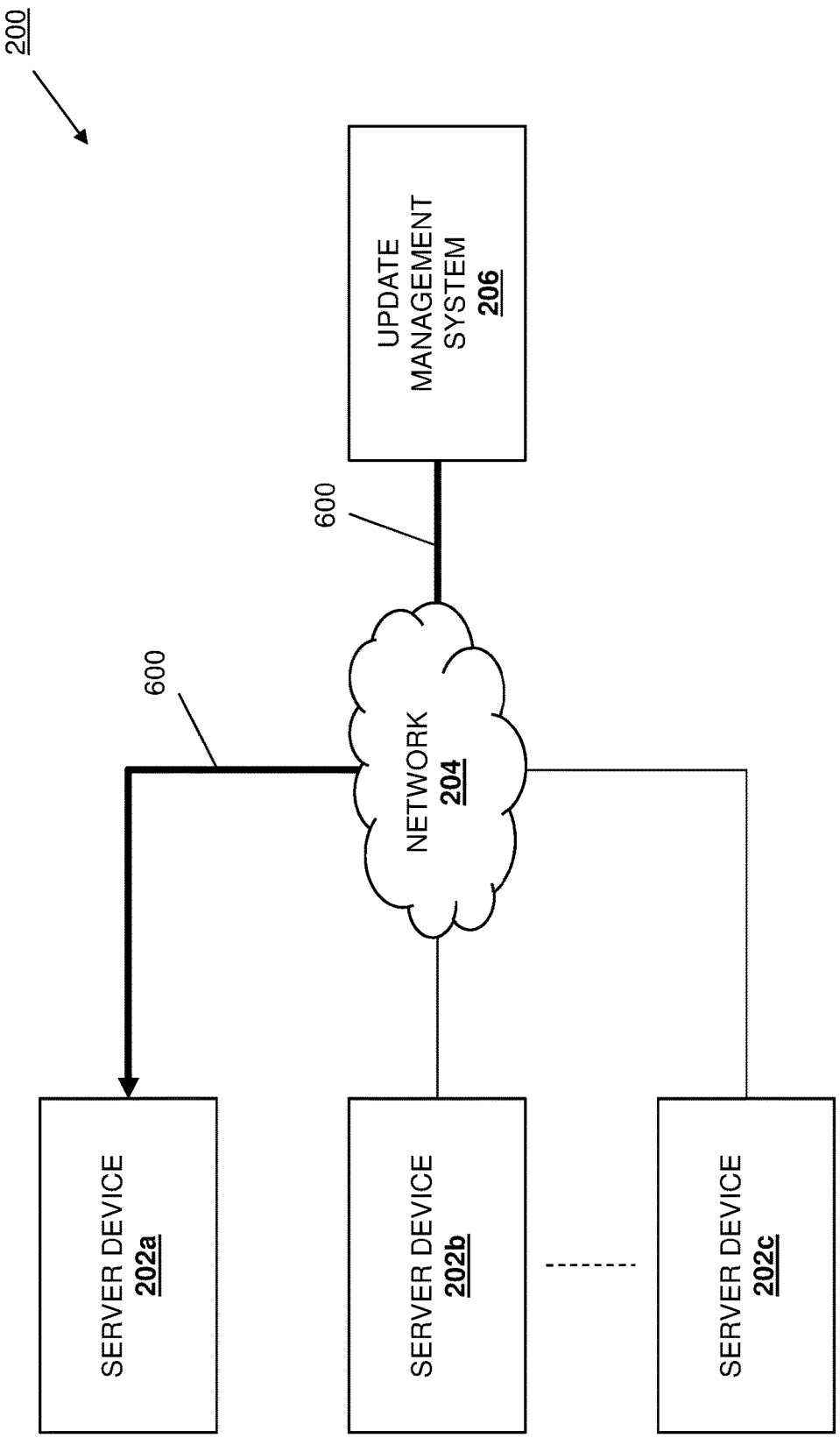
FIG. 6A is a schematic view illustrating an embodiment of the networked system of FIG. 2 operating during the method of FIG. 5.

The method 500 begins at block 502 where a remote access controller device determines that a BIOS firmware image is stored on a BIOS memory system. In an embodiment, at block 502, a BIOS firmware image may be provided on a secondary memory system in a server device. As will be appreciated by one of skill in the art in possession of the present disclosure, BIOS firmware updates are often developed and released for the BIOS included in server devices at relatively regular intervals, particular when compared to remote access controller updates that are developed and released for remote access controller devices in those server devices. As such, BIOS firmware images that include those BIOS firmware updates may be provided to server devices for use in updating the BIOS firmware utilized to provide the BIOS in those server devices. For example, FIG. 6A illustrates how the update management system 206 may perform BIOS firmware update operations 600 that include transmitting a BIOS firmware image via the network 204 to the server device 202a. However, while the BIOS firmware image is illustrated and described as being provided on the server device 202a via the network 202a, one of skill in the art in possession of the present disclosure will recognize that BIOS firmware images may be provided on server devices in a variety of manners that will fall within the scope of the present disclosure as well.

Figure 6B:
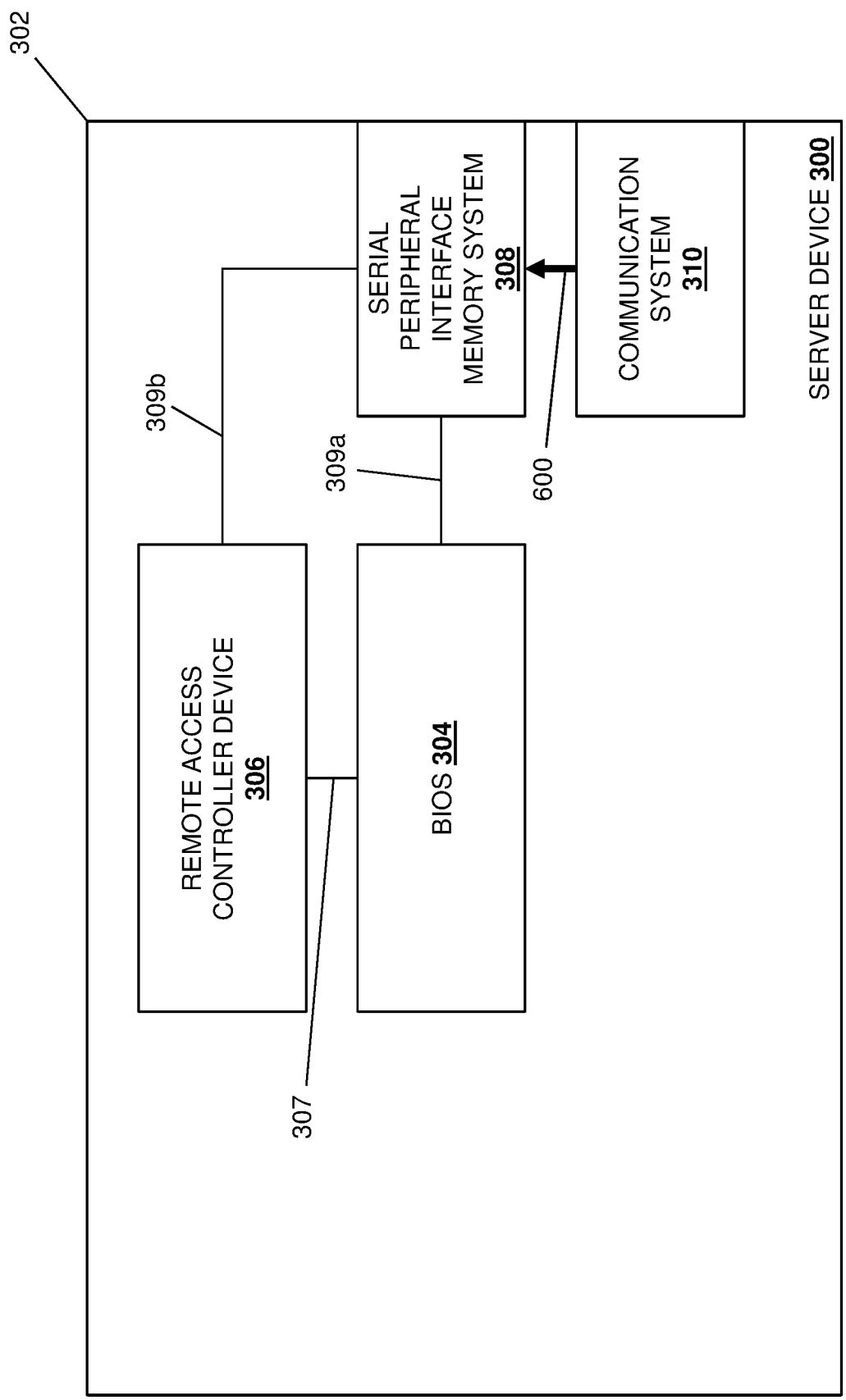
FIG. 6B is a schematic view illustrating an embodiment of the server device of FIG. 3 operating during the method of FIG. 5.
Figure 6C:
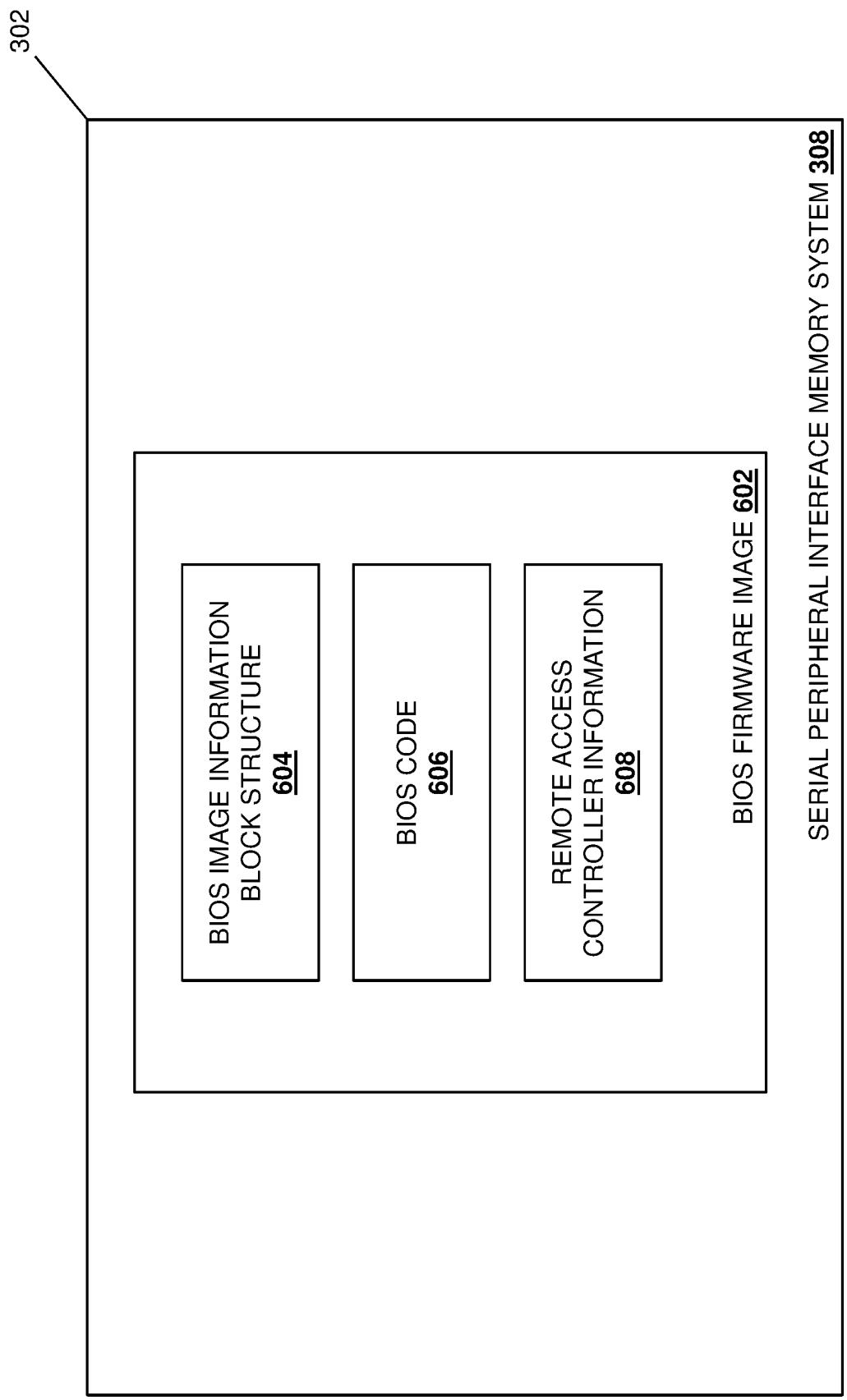
FIG. 6C is a schematic view illustrating an embodiment of a memory system in the server device of FIG. 3 operating during the method of FIG. 5.

As illustrated in FIG. 6B, the BIOS firmware update operations 600 may include the communication system 308 in the server device 202a/300 receiving the BIOS firmware image transmitted by the firmware management system 206, and that BIOS firmware image then being stored in the SPI memory system 308. With reference to FIG. 6C, an embodiment of a BIOS firmware image 602 that may be provided on the SPI memory system 308 via the BIOS firmware update operations 600 is illustrated, and includes a BIOS Image Information Block (IIB) structure 604, BIOS code 606 that provides the BIOS firmware update, and remote access controller information 608 that, as discussed in the specific examples provided below, may include updated server-device-platform-specific tables and/or software patch(es) for use by the remote access controller device 306. As will be appreciated by one of skill in the art in possession of the present disclosure, the BIOS code 606 in the BIOS firmware image 602 may provide an update for BIOS firmware utilized by the BIOS 304 in the server device 202a/300, and while not discussed in detail below, the BIOS 304 may be configured to access the BIOS code 606 in the BIOS firmware image 602 via the communication channel 309a and update its BIOS firmware with that BIOS code 606.

In an embodiment, the remote access controller information 608 may be provided in a signed binary format, integrated into the BIOS firmware image 602, and described in the BIOS IIB structure 604 via, for example, start and end addresses in the SPI memory system 308 for the remote access controller information 608, a hash value for the remote access controller information 608, and/or other IIB structure information known in the art. As discussed below, in some embodiments, the BIOS firmware image 602 may be securely signed, the BIOS IIB structure 604 may be securely signed, and/or the remote access controller information 608 may be securely signed in order to provide security associated with the use of the remote access controller information 608 discussed below.

In the specific examples discussed below, the remote access controller information 608 provides updated server-device-platform-specific tables and/or software patch(es) for use by the remote access controller device 306 with the server device 202a/300. For example, a processing system configuration in the server device 202a may be modified to utilize additional processing system cores, change the TDP of the processing system, and/or provide other processing system modifications that operate to change the thermal topology of the server device 202a, which one of skill in the art in possession of the present disclosure will appreciate will require an update to the service-device-platform-specific thermal tables and/or software patch(es) that are utilized by the remote access controller device 306 with the server device 202a/300. As such, the update management system 206 may be used to develop those updated service-device-platform-specific thermal tables and/or software patch(es), and provide those updated service-device-platform-specific thermal tables and/or software patch(es) to the server device 202a as part of the BIOS firmware image 602 as discussed above. However, while the updated remote access controller information is illustrated and described as being provided by service-device-platform-specific thermal tables and/or software patch(es), the remote access controller device information may include other service-device-platform-specific tables, bug fixes for the remote access controller device 306, and/or any other remote access controller information that would be apparent to one of skill in the art in possession of the present disclosure.

The method 500 then proceeds to block 504 where the remote access controller device identifies first remote access controller information in the BIOS firmware image. In an embodiment, at block 504, the remote access controller device 306 in the server device 202a/300 may identify the BIOS firmware image 602 in the SPI memory system 308. For example, following the storage of the BIOS firmware image 602 on the SPI memory system 308, the server device 202a/300 may be powered off and then powered on again, reset, and/or otherwise initialized and, in response, the remote access controller engine 404 in the remote access controller device 306/400 may operate to access the SRI memory system 308 and read and validate the BIOS firmware image 602 (e.g., as part of "root-of-trust" operations for the server device 202a/300). As will be appreciated by one of skill in the art in possession of the present disclosure, as part of the validation of the BIOS firmware image 602 at block 504, the remote access controller engine 404 may utilize a variety of validation techniques known in the art to validate a signature provided with the BIOS firmware image 602. Furthermore, one of skill in the art in possession of the present disclosure will appreciate that, in the event the BIOS firmware image 602 cannot be validated, the remote access controller engine 404 may ignore the BIOS firmware image 602, log a BIOS firmware image validation error, display a BIOS firmware image validation warning, cause the BIOS firmware image 602 to be removed from the SRI memory system 308, and/or perform other non-validated information operations that would be apparent to one of skill in the art in possession of the present disclosure.

Following the identification (and in some embodiments, the validation) of the BIOS firmware image 602, at block 504 the remote access controller engine 404 in the remote access controller device 306/400 may operate to access and validate the BIOS IIB structure 604. As will be appreciated by one of skill in the art in possession of the present disclosure, as part of the validation of the BIOS IIB structure 604 at block 504, the remote access controller engine 404 may utilize a variety of validation techniques known in the art to validate a signature provided with the BIOS IIB structure 604. Furthermore, one of skill in the art in possession of the present disclosure will appreciate that, in the event the BIOS IIB structure 604 cannot be validated, the remote access controller engine 404 may ignore the BIOS firmware image 602 and/or the BIOS IIB structure 604, log a BIOS IIB structure validation error, display a BIOS IIB structure validation warning, cause the BIOS firmware image 602 to be removed from the SRI memory system 308, and/or perform other non-validated information operations that would be apparent to one of skill in the art in possession of the present disclosure.

Following the identification (and in some embodiments, the validation) of the BIOS IIB structure 604, at block 504 the remote access controller engine 404 in the remote access controller device 306/400 may utilize the BIOS IIB structure 604 to identify the remote access controller information 608. As discussed above, the BIOS IIB structure 604 may describe the remote access controller information 608 via, for example, start and end addresses in the SRI memory system 308 for the remote access controller information 608, a hash value for the remote access controller information 608, and/or other IIB structure information known in the art. As such, at block 504, the remote access controller engine 404 may identify the remote access controller information 608 via its start and end addresses in the SRI memory system 308 identified by the BIOS IIB structure 604. In some embodiments, at block 504 the remote access controller engine 404 ma validate the remote access controller information 608. As will be appreciated by one of skill in the art in possession of the present disclosure, as part of the validation of the remote access controller information 608 at block 504, the remote access controller engine 404 may utilize a variety of validation techniques known in the art to validate a signature (and/or the hash value for the remote access controller information 608 in the BIOS IIB structure 604) provided with the remote access controller information 608. Furthermore, one of skill in the art in possession of the present disclosure will appreciate that, in the event the remote access controller information 608 cannot be validated, the remote access controller engine 404 may ignore the BIOS firmware image 602 and/or the remote access controller information 608, log a remote access controller information validation error, display a remote access controller information validation warning, cause the BIOS firmware image 602 to be removed from the SRI memory system 308, and/or perform other non-validated information operations that would be apparent to one of skill in the art in possession of the present disclosure.

As such, continuing with the example in which the remote access controller information 608 is provided by server-device-platform-specific thermal tables and/or software patch(es), at block 504 and during initialization operations for the server device 202a/300, the remote access controller engine 404 in the remote access controller device 306/400 may access the SRI memory system 308, validate/authenticate the BIOS firmware image 602, validate/authenticate the BIOS IIB structure 604, use the BIOS IIB structure 604 to identify the server-device-platform-specific thermal tables and/or software patch(es), and validate/authenticate the server-device-platform-specific thermal tables and/or software patch(es). However, while specific remote access controller information identification in a BIOS firmware update has been described that includes several validation/authentication operations, one of skill in the art in possession of the present disclosure will appreciate that remote access controller information may be identified in a BIOS firmware update in a variety of manners that will fall within the scope of the present disclosure as well. For example, in some embodiments, the BIOS 304 in the server device 202a/300 may operate to identify the remote access controller information 608 in the BIOS firmware image 602 (e.g., in a manner similar to that described above by the remote access controller device 306/400), and then transmit the remote access controller information 608 to the remote access controller device 306/400 via the communication channel 307.

Figure 7A:
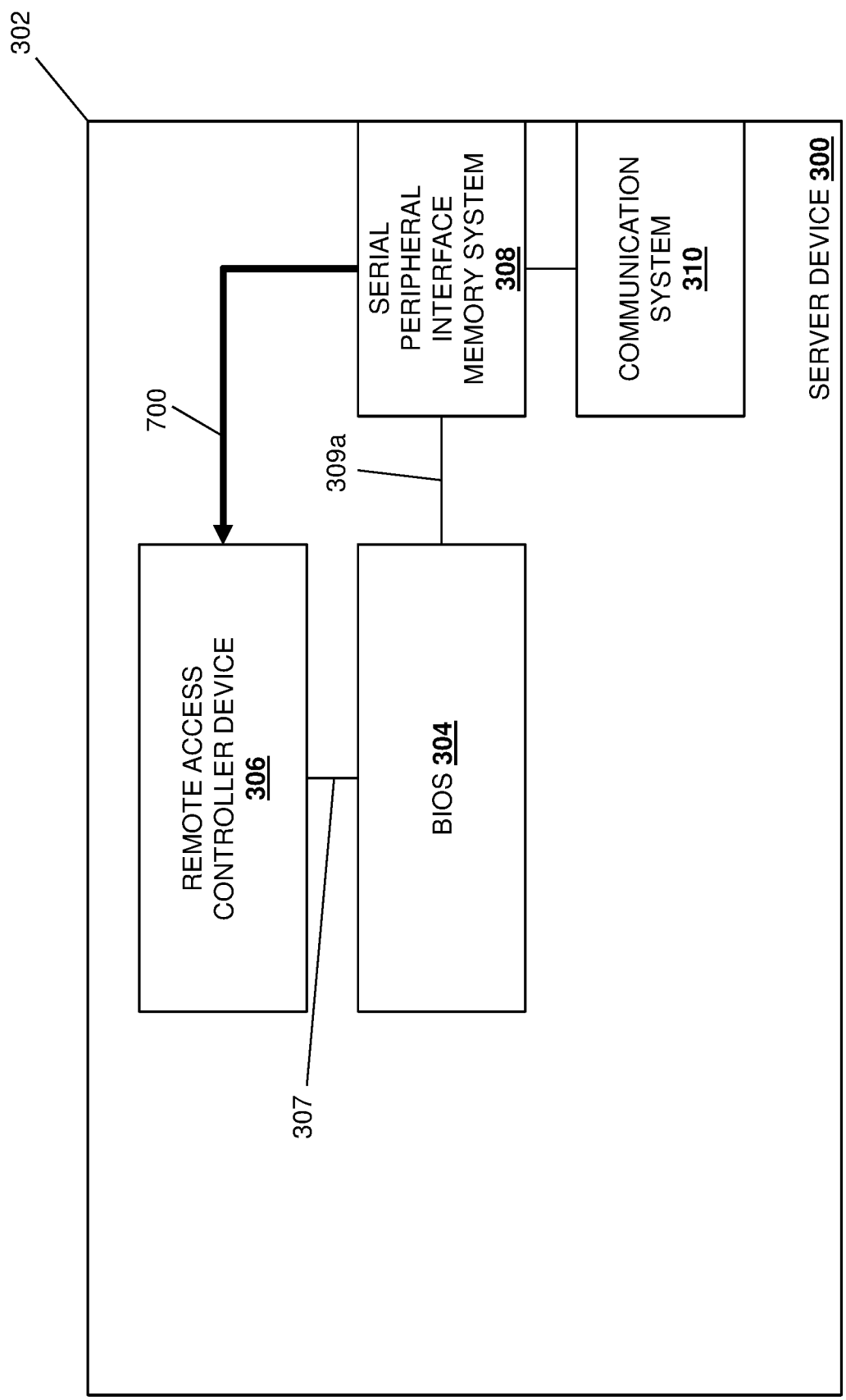
FIG. 7A is a schematic view illustrating an embodiment of the server device of FIG. 3 operating during the method of FIG. 5.
Figure 7B:
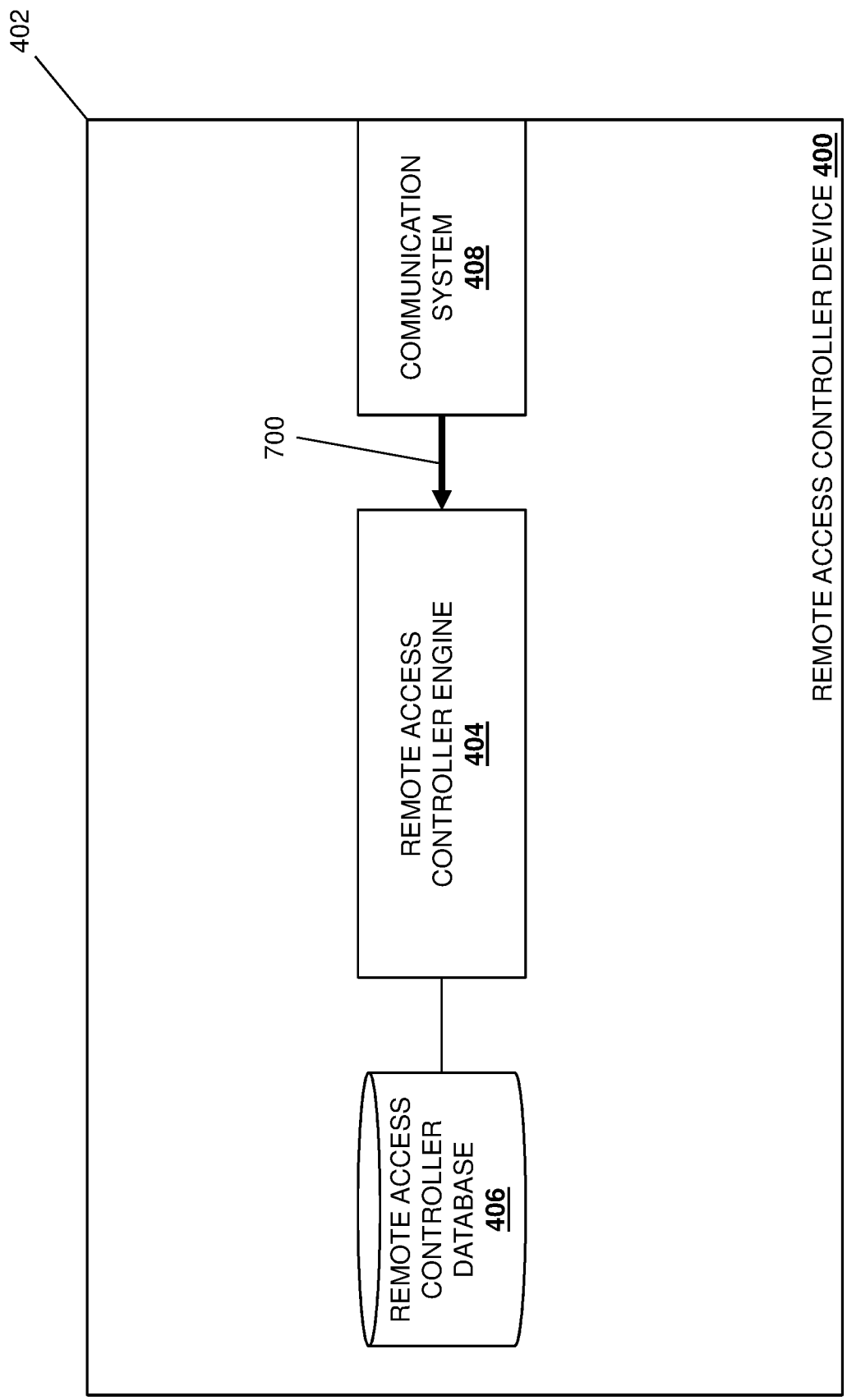
FIG. 7B is a schematic view illustrating an embodiment of the remote access controller device of FIG. 4 operating during the method of FIG. 5.

The method 500 then proceeds to decision block 506 where it is determined whether the first remote access controller information updates second remote access controller information on the remote access controller device. In an embodiment, at decision block 506, the remote access controller engine 404 in the remote access controller device 306/400 may compare the remote access controller information 608 identified in the BIOS firmware update image 602 at block 504 with remote access controller information 608 stored in the remote access controller database 406. For example, FIGS. 7A and 7B illustrate how the remote access controller engine 404 in the remote access controller device 306/400 may perform remote access controller information retrieval operations 700 to retrieve at least some of the remote access controller information 608 stored in the remote access controller database 406, and determine whether the remote access controller information 608 updates remote access controller information that is stored in its remote access controller database 406.

In a specific example, remote access controller information stored on the remote access controller database 406 in the remote access controller device 306/400 may include a first version of server-device-platform-specific thermal tables and/or software patch(es) that are utilized by the remote access controller engine 404 with the server device 202a/300, and at decision block 506 the remote access controller engine 404 in the remote access controller device 306/400 may perform the remote access controller information retrieval operations 700 to retrieve a second version of server-device-platform-specific thermal tables and/or software patch(es) provided in the remote access controller information 608 stored in the remote access controller database 406, and determine whether second version of the server-device-platform-specific thermal tables and/or software patch(es) provided in the remote access controller information 608 is a more recent version than the first version of the server-device-platform-specific thermal tables and/or software patch(es) stored in its remote access controller database 406. However, while a specific example is provided, one of skill in the art in possession of the present disclosure will appreciate that updated remote access controller information may be identified in a variety of manners that will fall within the scope of the present disclosure as well.

If, at decision block 506, it is determined that the first remote access controller information does not update the second remote access controller information on the remote access controller device, the method 500 proceeds to block 508 where the remote access controller device ignores the first remote access controller device. In an embodiment, at block 508 and in response to determining that the remote access controller information 608 does not provide an update to remote access controller information stored in the remote access controller database 406, the remote access controller engine 404 in the remote access controller device 306/400 may ignore the remote access controller information 608. As will be appreciated by one of skill in the art in possession of the present disclosure, the remote access controller information stored in the remote access controller database 406 may be the same as, or newer than, the remote access controller information 608 such that the remote access controller information 608 does not provide an update to remote access controller information stored in the remote access controller database 406, and thus the remote access controller engine 404 need to utilize that remote access controller information 608 and may ignore it.

As such, continuing with the example in which the remote access controller information 608 is provided by server-device-platform-specific thermal tables and/or software patch(es), server-device-platform-specific thermal tables and/or software patch(es) already stored in the remote access controller database 406 may be the same version as, or a newer version than, the server-device-platform-specific thermal tables and/or software patch(es) included in the remote access controller information 608 such that those server-device-platform-specific thermal tables and/or software patch(es) do not provide an update to server-device-platform-specific thermal tables and/or software patch(es) already stored in the remote access controller database 406, and thus the remote access controller engine 404 need not utilize the server-device-platform-specific thermal tables and/or software patch(es) included in the remote access controller information 608 and may ignore them. As will be appreciated by one of skill in the art in possession of the present disclosure, in some embodiments a remote access controller firmware update (which as discussed above is released relatively less often then the BIOS firmware updates) may be provided in the SPI memory system 308 along with the BIOS firmware image, and the update/version check performed as discussed above may allow the remote access controller engine 404 in the remote access controller device 306/400 to identify the most recent update/version of the remote access controller information included in each of the BIOS firmware image and the remote access controller firmware update, and select that update/version of the remote access controller information for use with the server device 202a/300.

Figure 7C:
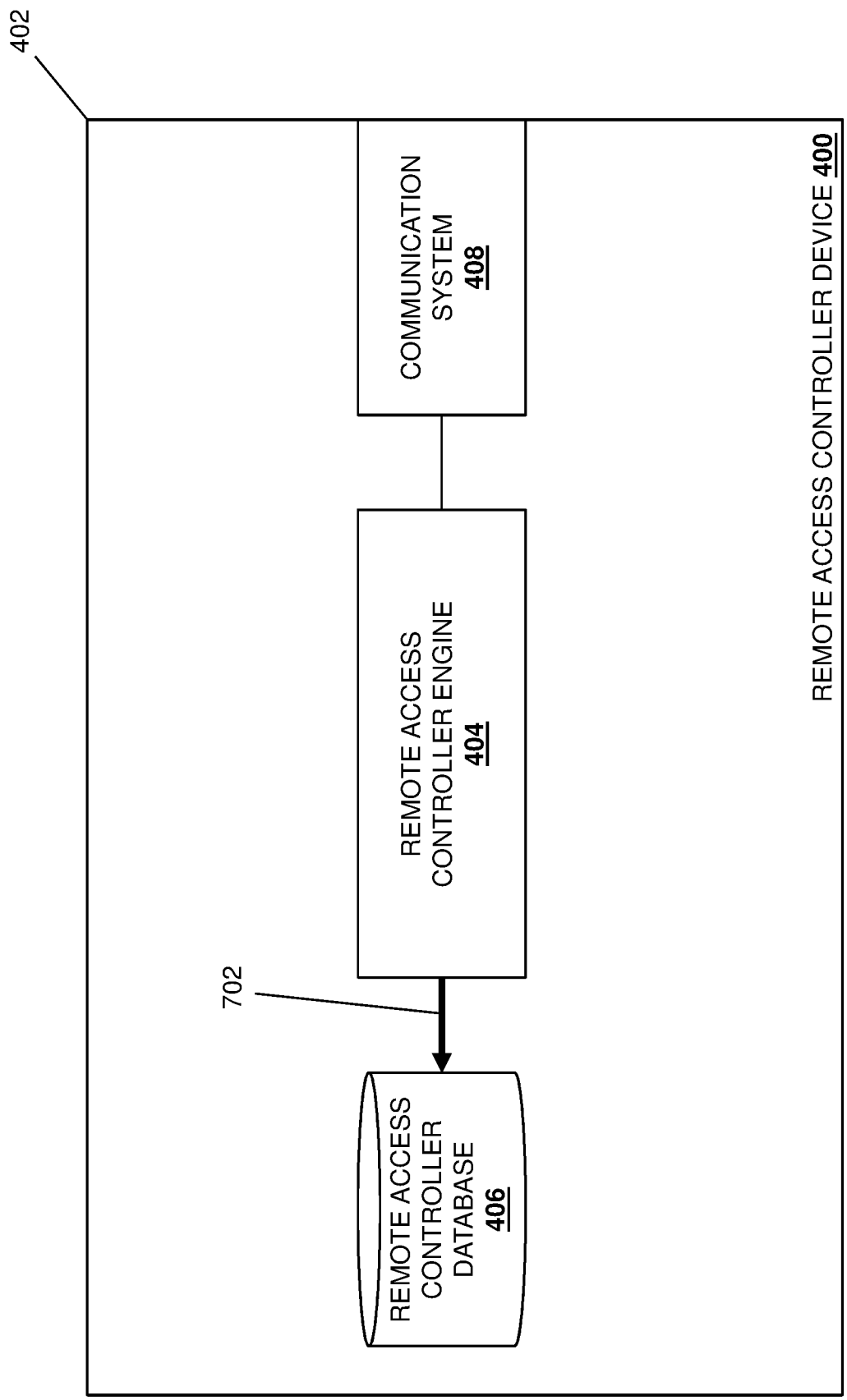
FIG. 7C is a schematic view illustrating an embodiment of the remote access controller device of FIG. 4 operating during the method of FIG. 5.

If at decision block 506, it is determined that the first remote access controller information updates second remote access controller information on the remote access controller device, the method 500 proceeds to block 510 where the remote access controller device copies the first remote access controller information to the remote access controller device. In an embodiment, at block 510 and in response to determining that the remote access controller information 608 provides an update to remote access controller information stored in the remote access controller database 406, the remote access controller engine 404 in the remote access controller device 306/400 may operate to copy the remote access controller information 608 from the SRI memory system 308 to the remote access controller database 406. For example, with reference to FIG. 7C, the remote access controller engine 404 is illustrated as performing remote access controller information copy operations 702 to copy the remote access controller information 608 (e.g., retrieved from the SRI memory system 308 via the remote access controller information retrieval operations 700 discussed above) to the remote access controller database 406. In a specific example, the remote access controller information copy operations 702 at block 510 may include overwriting the remote access controller information in the remote access controller database 406 with the remote access controller information 608 retrieved from BIOS firmware image 602 in the SRI memory system 308. Following the copying of the remote access controller information 608 to the remote access controller database 406, the remote access controller engine 404 in the remote access controller device 306/400 may allow the server device 202a/300 to complete initialization operations and enter a runtime state.

As such, continuing with the example in which the remote access controller information 608 is provided by server-device-platform-specific thermal tables and/or software patch(es), the server-device-platform-specific thermal tables and/or software patch(es) included in the remote access controller information 608 may be a newer version than the server-device-platform-specific thermal tables and/or software patch(es) already stored in the remote access controller database 406 such that the server-device-platform-specific thermal tables and/or software patch(es) included in the remote access controller information 608 provide an update to server-device-platform-specific thermal tables and/or software patch(es) already stored in the remote access controller database 406, and the remote access controller engine 404 may operate to overwrite the server-device-platform-specific thermal tables and/or software patch(es) already stored in the remote access controller database 406 with the server-device-platform-specific thermal tables and/or software patch(es) included in the remote access controller information 608.

Furthermore, one of skill in the art in possession of the present disclosure will appreciate how the remote access controller information 608 may provide an update to the remote access controller device 306/400 if that remote access controller information 608 is provided for utilization by the remote access controller device 306/400 with server device 202a/300 and there is no similar remote access controller information included in the remote access controller database 406 (e.g., "new" server-device-platform-specific tables and/or software patch(es) (e.g., that do not correspond to any earlier-version server-device-platform-specific tables and/or software patch(es)) may be developed and provided to the remote access controller device 306/400 in the BIOS firmware image 602 while remaining within the scope of the present disclosure as well.

The method 500 then proceeds to block 512 where the remote access controller device performs operation(s) using the first remote access controller information. In an embodiment, at block 512, the remote access controller engine 404 in the remote access controller device 306/400 may utilize the remote access controller information 608 to perform one or more operations. As such, continuing with the example in which the remote access controller information 608 is provided by server-device-platform-specific thermal tables and/or software patch(es), at block 512 the remote access controller engine 404 may utilize the server-device-platform-specific thermal tables and/or software patch(es) included in the remote access controller information 608 that is now stored in the remote access controller database 406 in order to perform one or more thermal operations for the server device 202*a*/300 (e.g., for a processing system included in the server device 202*a*/300) and/or one or more software patching operations for the remote access controller engine 404 or remote access controller device 306/400. However, while a specific example is provided, one of skill in the art in possession of the present disclosure will appreciate that a remote access controller device may utilize updated remote access controller information provided via the teachings of the present disclosure in any of a variety of manners that will fall within the scope of the present disclosure.

Thus, systems and methods have been described that provide remote access controller server-device-platform-specific table and/or software patch updates in more regularly released BIOS firmware updates. For example, the remote access controller device update system of the present disclosure may include a BIOS SPI ROM/flash memory that is configured to store a BIOS firmware image including BIOS code, first remote access controller server-device-platform-specific tables, and/or software patch(es). A BIOS is coupled to the BIOS SPI ROM/flash memory and is configured to utilize BIOS code stored on the memory system. A remote access controller device is coupled to the BIOS SPI ROM/flash memory and is configured to determine that the BIOS firmware image is stored in the BIOS SPI ROM/flash memory, and identify the first remote access controller server-device-platform-specific tables and/or software patch(es) included in the BIOS firmware image. The remote access controller device then determines that the first remote access controller server-device-platform-specific tables and/or software patch(es) provide an update to second remote access controller server-device-platform-specific tables and/or software patch(es) stored on the remote access controller device and, in response, stores the first remote access controller server-device-platform-specific tables and/or software patch(es) on the remote access controller device and performs at least one operation using the first remote access controller server-device-platform-specific tables and/or software patch(es). Thus, the update of server-device-platform-specific tables and/or software patch(es) on remote access controller devices is enabled without the need to develop and release new remote access controller firmware each time an update of the server-device-platform-specific tables and/or software patch(es) on the remote access controller device is required, reducing the number of releases (and associated development) of remote access controller firmware, and allowing for the provision of a "golden" remote access controller firmware image (i.e., that does not include the server-device-platform-specific tables and/or software patch(es)).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A remote access controller device update system, comprising:
   a memory system that is configured to store a Basic Input/Output System (BIOS) firmware image that includes:
   BIOS code; and
   first remote access controller information;
   a BIOS that is coupled to the memory system and that is configured to utilize the BIOS code stored on the memory system; and
   a remote access controller device that is coupled to the memory system and that is configured to:
   determine that the BIOS firmware image is stored in the memory system;
   identify the first remote access controller information included in the BIOS firmware image;
   determine that a first version of at least one server device platform table that is 1) associated with a server device that includes the remote access controller device, and that is 2) included in the first remote access controller information, provides an update to a second version of the at least one server device platform table that is included in second remote access controller information that is stored on the remote access controller device;
   store, in response determining that the first version of the at least one server device platform table provides the update to the second version of the at least one server device platform table, the first remote access controller information on the remote access controller device; and
   perform at least one operation using the first remote access controller information.

2. The remote access controller device update system of claim 1, wherein the remote access controller device is configured to identify the first remote access controller information included in the BIOS firmware image by:
   identifying an Image Information Block (IIB) structure in the BIOS firmware image; and
   using the IIB structure to locate the first remote access controller information included in the BIOS firmware image.

3. The remote access controller device update system of claim 1, wherein the remote access controller device is configured to:
   validate the first remote access controller information prior to performing the at least one operation using the first remote access controller information.

4. The remote access controller device update system of claim 1, wherein the remote access controller device is configured to:
   validate the BIOS firmware image prior to identifying the first remote access controller information included in the BIOS firmware image.

5. The remote access controller device update system of claim 1, wherein the at least one server device platform table includes a processing system configuration of the server device that includes the remote access controller device.

6. An Information Handling System (IHS), comprising:
a remote access controller processing system; and
a remote access controller memory system that is coupled to the remote access controller processing system and that includes instructions that, when executed by the remote access controller processing system, cause the remote access controller processing system to provide a remote access controller engine that is configured to:
determine that a Basic Input/Output System (BIOS) firmware image is stored in a BIOS memory system;
identify first remote access controller information that is included in the BIOS firmware image;
determine that a first version of at least one server device platform table that is 1) associated with a server device that includes the remote access controller device, and that is 2) included in the first remote access controller information, provides an update to a second version of the at least one server device platform table that is included in second remote access controller information that is stored on a remote access controller database;
store, in response determining that the first version of the at least one server device platform table provides the update to the second version of the at least one server device platform table, the first remote access controller information on the remote access controller database; and
perform at least one operation using the first remote access controller information.

7. The IHS of claim 6, wherein the remote access controller engine is configured to identify the first remote access controller information included in the BIOS firmware image by:
identifying an Image Information Block (IIB) structure in the BIOS firmware image; and
using the IIB structure to locate the first remote access controller information included in the BIOS firmware image.

8. The IHS of claim 6, wherein the remote access controller engine is configured to:
validate the first remote access controller information prior to performing the at least one operation using the first remote access controller information.

9. The IHS of claim 6, wherein the remote access controller engine is configured to:
validate the BIOS firmware image prior to identifying the first remote access controller information included in the BIOS firmware image.

10. The IHS of claim 6, wherein the at least one server device platform table includes a processing system configuration of the server device that includes the remote access controller processing system and the remote access controller memory system.

11. The IHS of claim 10, wherein the processing system configuration of the server device that includes the remote access controller processing system and the remote access controller memory system includes at least one of 1) a number of processing system cores, and 2) a Thermal Design Power (TDP) of a processing system.

12. A method for updating a remote access controller device, comprising:
determining, by a remote access controller device, that a Basic Input/Output System (BIOS) firmware image is stored in a BIOS memory system;
identifying, by the remote access controller device, first remote access controller information that is included in the BIOS firmware image;
determining, by the remote access controller device, that a first version of at least one server device platform table that is 1) associated with a server device that includes the remote access controller device, and that is 2) included in the first remote access controller information, provides an update to a second version of the at least one server device platform table that is included in second remote access controller information that is stored on a remote access controller database;
storing, by the remote access controller device in response determining that the first version of the at least one server device platform table provides the update to the second version of the at least one server device platform table, the first remote access controller information on the remote access controller database; and
performing, by the remote access controller device, at least one operation using the first remote access controller information.

13. The method of claim 12, wherein the identifying the first remote access controller information included in the BIOS firmware image includes:
identifying, by the remote access controller device, an Image Information Block (IIB) structure in the BIOS firmware image; and
using, by the remote access controller device, the IIB structure to locate the first remote access controller information included in the BIOS firmware image.

14. The method of claim 12, further comprising:
validating, by the remote access controller device, the first remote access controller information prior to performing the at least one operation using the first remote access controller information.

15. The method of claim 12, further comprising:
validating, by the remote access controller device, the BIOS firmware image prior to identifying the first remote access controller information included in the BIOS firmware image.

16. The method of claim 12, wherein the at least one server device platform table includes a processing system configuration of the server device that includes the remote access controller device.

17. The method of claim 16, wherein the processing system configuration of the server device that includes the remote access controller device includes at least one of 1) a number of processing system cores, and 2) a Thermal Design Power (TDP) of a processing system.

18. A remote access controller device update system, comprising:
a memory system that is configured to store a Basic Input/Output System (BIOS) firmware image that includes:
BIOS code; and
first remote access controller information;
a BIOS that is coupled to the memory system and that is configured to utilize BIOS code stored on the memory system; and
a remote access controller device that is coupled to the memory system and that is configured to:
determine that the BIOS firmware image is stored in the memory system;

identify an Image Information Block (IIB) structure in the BIOS firmware image;

validate the IIB structure;

use, subsequent to validating the IIB structure, the IIB structure to locate a first remote access controller information included in the BIOS firmware image;

determine that the first remote access controller information provides an update to second remote access controller information that is stored on the remote access controller device;

store, in response determining that the first remote access controller information provides the update to the second remote access controller information, the first remote access controller information on the remote access controller device; and perform at least one operation using the first remote access controller information.

19. An Information Handling System (IHS), comprising:

a remote access controller processing system; and a remote access controller memory system that is coupled to the remote access controller processing system and that includes instructions that, when executed by the remote access controller processing system, cause the remote access controller processing system to provide a remote access controller engine that is configured to:

determine that a Basic Input/Output System (BIOS) firmware image is stored in a BIOS memory system;

identify an Image Information Block (IIB) structure in the BIOS firmware image;

validate the IIB structure;

use, subsequent to validating the IIB structure, the IIB structure to locate the first remote access controller information included in the BIOS firmware image;

determine that the first remote access controller information provides an update to second remote access controller information that is stored on a remote access controller database;

store, in response determining that the provides the update to the second remote access controller information, the first remote access controller information on the remote access controller database; and perform at least one operation using the first remote access controller information.

20. A method for updating a remote access controller device, comprising:

determining, by a remote access controller device, that a Basic Input/Output System (BIOS) firmware image is stored in a BIOS memory system;

identifying, by the remote access controller device, an Image Information Block (IIB) structure in the BIOS firmware image;

validating, by the remote access controller device, the IIB structure;

using, by the remote access controller device subsequent to validating the IIB structure, the IIB structure to locate the first remote access controller information included in the BIOS firmware image;

determining, by the remote access controller device, that the first remote access controller information provides an update to second remote access controller information that is stored on a remote access controller database;

storing, by the remote access controller device in response determining that the first remote access controller information provides the update to the second remote access controller information, the first remote access controller information on the remote access controller database; and performing, by the remote access controller device, at least one operation using the first remote access controller information.

* * * * *

UNITED STATES PATENT AND TRADEMARK OFFICE
CERTIFICATE OF CORRECTION

PATENT NO. : 11,409,518 B2  
APPLICATION NO. : 16/936641  
DATED : August 9, 2022  
INVENTOR(S) : Maddukuri et al.

Page 1 of 1

It is certified that error appears in the above-identified patent and that said Letters Patent is hereby corrected as shown below:

In the Specification

Column 6, Line 62, "SRI" should be changed to --SPI--;  
Column 9, Lines 5, 20, 41, 52, and 58, "SRI", each occurrence, should be changed to --SPI--;  
Column 10, Lines 11 and 21, "SRI", each occurrence, should be changed to --SPI--;  
Column 12, Lines 18, 24, and 32, "SRI", each occurrence, should be changed to --SPI--.

In the Claims

Claim 19, Column 18, Line 1, "store, in response determining that the provides the" should be changed to --store, in response determining that the first remote access controller information provides the--.

Signed and Sealed this  
Fourth Day of October, 2022

Katherine Kelly Vidal  
*Director of the United States Patent and Trademark Office*